Patented Feb. 8, 1949

2,460,823

UNITED STATES PATENT OFFICE 2,460,823

ACYLATING FURANS

Howard D. Hartough, Pitman, N. J., and Alvin I. Kosak, Columbus, Ohio, assignors to Socony-Vacuum Oil Company, Incorporated, a corporation of New York No Drawing. Application February 23, 1946, Serial No. 649,740

20 Claims. (Cl. 260—345)

This invention relates to a process for the acylation of furans and, more particularly, is directed to a catalytic method for acylating furan and its derivatives in the presence of a sulfur, phosphorus, or fluorine-containing hydroxy acid.

Acylation reactions are well known in the art and connote the union between acyl radicals and molecules of organic compounds under conditions of temperature, pressure and time ordinarily referred to in the art as acylating conditions. The compounds thus produced represent structurally the substitution of the original acyl radical for a hydrogen atom on the organic compound molecule.

As a general rule, the temperature, pressure and time of reaction employed in acylation operations depend upon whether the acylation is effected in the absence or presence of catalysts. The two methods are generally referred to as thermal and catalytic acylation, respectively. The majority of acylation processes fall under the latter category and it is a catalytic acylation process with which the present invention is concerned.

Acyl radicals may be furnished in acylation reactions by various materials commonly referred to as acylating agents. Thus, the anhydrides of carboxylic acids and acyl halides have served as sources of the acyl radical. In particular, acetic anhydride and acetyl chloride have found wide application as acylating agents.

The acylation of furan and furan derivatives has previously been carried out employing one of the above mentioned acylating agents in the presence of various catalysts, including stannic chloride, ferric chloride, aluminum chloride and titanium tetrachloride.

These catalysts, although applicable with considerable success in the acylation of aromatic hydrocarbons, are only moderately successful where furan is involved. It has been postulated that this may, in part, be accounted for by the fact that the compounds employed as catalysts form addition complexes with the carbonyl group of the resulting ketone substantially decreasing the yield of desired product and requiring a considerable excess of catalyst over the theoretical amount required for the acylation reaction. Thus, when aluminum chloride is used as the condensing agent, the ratio of catalyst to acyl chloride is at least one and, in the case of acid anhydrides, at least two. Likewise, other catalysts of the Friedel-Crafts type must be used in molecular quantities with respect to the acyl halide being employed in the acylation of furan. This is probably due to the fact that acyl halides form comparatively stable molecular complexes with aluminum chloride and the other above-mentioned catalysts, thereby decreasing their catalytic effect. Furthermore, it would appear that molecular equivalent amounts of Friedel-Crafts type catalysts are generally needed in promoting reactions wherein a compound having an oxygen linkage such as that found in furan is being treated. Thus, even in the case of an alkylation reaction which, for aromatic compounds, requires only a trace of Friedel-Crafts catalyst, for the furans, a molecular equivalent of the catalyst must be used.

While yields of acylated furan as high as 50 per cent of theory have been reported using an aluminum chloride catalyst, these figures have been the exception rather than the rule. In general, the yields of acyl furans heretofore obtained have averaged about 35 per cent of theory. These comparatively small yields were believed to be due, at least in part, to the relatively large quantities of catalyst being employed; that is, amounts of the order of molecular quantities with respect to reactants being used. Attempts were accordingly made to overcome the existing difficulties by the use of traces or catalytic amounts of aluminum chloride. Minute amounts of this compound, however, failed to catalytically produce any of the desired furyl ketone.

It has now been discovered that acylated furans may be obtained in an efficient manner by reacting furan or furan derivatives with an acylating agent in the presence of a catalyst comprising a strong hydroxy acid containing phosphorus, sulfur, or fluorine. It has been found that by using an acylating catalyst comprising a hydroxy acid of one or more of these elements, the above-mentioned difficulties encountered in the acylation of furan have been largely overcome. It would appear that the advantages obtained using a strong hydroxy acid can be attributed, at least in part, to the fact that relatively small quantities of acid can be used as effective catalysts in the acylation of furan. Hence, in addition to providing a higher yield of desired product, the present process affords a more economical and efficient catalyst for the acylation of furan than has been used heretofore. Thus, in accordance with the process of the present invention, a catalyst comprising a strong hydroxy acid containing sulfur, phosphorus or fluorine produces a product consisting almost entirely of acyl furans having one or more side chains corresponding to that of the acylating agent and being relatively free of polymerized or decomposed side product.

It is accordingly an object of the present invention to provide an efficient process for synthesizing acylated furans. Another object is to provide a process for catalytically acylating furan and its derivatives. A still further object is to afford a process for catalytically acylating furan in a direct manner which can be easily carried out using a relatively inexpensive catalyst in small amounts. A very important object is to provide a process capable of reacting furan or its derivatives with an acylating agent in the presence of an efficient catalyst to give a yield of acylated furan substantially greater than that heretofore obtained.

These and other objects which will be recognized by those skilled in the art are obtained in accordance with the present invention wherein furan or its derivatives are acylated by reaction with organic carboxylic acid anhydrides in the presence of a strong hydroxy acid containing sulfur, phosphorus, or fluorine.

The catalysts in question are strong acids containing at least one hydroxy group in the molecule, such as phosphoric acid and sulfuric acid. While the mechanism of the acylation reaction is not definitely known, it has been noted that strong acids, such as hydrochloric acid, which do not contain hydroxy groups are ineffective as catalysts. Likewise, weak acids containing hydroxy groups, such as boric acid, fail to catalytically promote the acylation of furan. Representative of the acidic catalysts contemplated for use in this invention are the hydroxy acids of sulfur and phosphorus and the fluorine-containing acids which have one or more hydroxy groups, such as the fluophosphoric and hydroxy fluoboric acids. In general, acids of the above type, having an ionization constant greater than $1.0 \times 10^{-2}$ for the first hydrogen atom, are employed as catalysts in the process of this invention.

The acylating agents to be used herein are organic carboxylic acid anhydrides. Included in this category are the ketenes having the basic structure

and which, upon addition of water, yield carboxylic acids. The carboxylic acid anhydrides may be derived by methods well known to the art from mono- or polybasic organic acids which may be either unsaturated or saturated. Representative acylating agents to be used in the present process include the anhydrides of saturated fatty acids, such as acetic anhydride, propionic anhydride, ketene, etc.; the anhydrides of unsaturated acids, such as crotonic anhydride; and the anhydrides of aromatic acids, such as benzoic anhydride. These acylating agents are given merely by way of example and are not to be construed as limiting since other carboxylic acid anhydrides, which will readily suggest themselves to those skilled in the art, may likewise be used.

In addition to furan itself, derivatives of furan having one or more substituent groups, such as halogen, alkyl, aryl, or alkoxy groups attached to the furan ring may likewise be acylated in accordance with this invention. Other furan derivatives including those having substituents of a highly negative character, such as carbonyl, carboxylic ester, nitro, and cyano groups, may also be acylated in the presence of strong hydroxy acids containing sulfur, phosphorus, or fluorine.

The acylation of furan may be carried out employing equimolar quantities of furan acylating agent. However, the presence of an excess of one of these reactants has, in general, been found to give an increased yield of the desired product. Thus, an excess of either acylating agent or furan gave an increased amount of ketone as compared with those reactions in which equimolar quantities were used.

The temperature at which the reaction is carried out may vary over a wide extent, the upper limit being dependent on the boiling point of the reactants at the specific pressure of the reaction. Temperatures varying between about $-20°$ C. and about $60°$ C. have been found satisfactory for effecting the acylation. However, generally it is more preferable to employ temperatures in the lower range of from about $0°$ C. to about $25°$ C. Pressures varying between about 1 and about 10 atmospheres have been found satisfactory in the acylation process. The effect of increased pressure, theoretically, is toward increased reaction but from a practical standpoint this is not a very great effect with reactions such as involved herein which go readily at normal pressures. The temperature to be employed will depend on the time of reaction and the nature of acylating agent used. Under the conditions usually encountered in the process of this invention, however, the reaction period will generally vary from about ½ hour to about 3 hours. In general, however, the acylation process proceeds rapidly and is normally complete within an hour.

The strong hydroxy acids containing sulfur, phosphorus or fluorine, employed herein as catalysts, may be either organic or inorganic acids containing one or more of these elements. The inorganic acids, however, generally having higher dissociation constants and being more readily obtainable, will usually be used. The sulfur, phosphorus, or fluorine-containing acids having one or more hydroxy groups present may be employed in amounts as little at 0.1 per cent by weight of the reactants. However, amounts varying between about 0.5 and about 4 per cent by weight of the reaction charge are preferable. Representative acids contemplated for use herein as catalysts include strong hydroxy acids of phosphorus, such as phosphoric and phosphorous acids; strong hydroxy acids of sulfur, such as sulfuric and the sulfonic acids, including the toluene sulfonic acids; strong hydroxy acids containing fluorine, such as fluosulfonic acid, dihydroxy-fluoboric acid, and fluophosphoric acid. Other hydroxy acids of fluorine, sulfur, or phosphorus having relatively high dissociation constants, that is, generally greater than $1.0 \times 10^{-2}$ for the first hydrogen atom, are likewise contemplated for use as catalysts in the acylation of furan and its derivatives. Hence, the above representative list of suitable catalysts is not to be considered as limiting.

An essential feature of the present invention is that it be a strong hydroxy containing acid of phosphorus, sulfur, or fluorine. Strong hydroxy acids not containing one of these elements, such as picric acid, and weak hydroxy acids, such as boric acid, did not exhibit any catalytic activity as acylation catalysts. Likewise, strong inorganic acids which do not contain hydroxy groups were also devoid of any catalytic effect. The chemistry of furan is in many respects similar to that of benzene. However, it is to be noted that the catalysts of the present invention are inoperative as catalysts for the acylation of benzene.

The process of this invention accordingly comprises mixing furan or furan derivative, acylating agent and a catalyst comprising a strong hydroxy acid of phosphorus, sulfur, or fluorine, heating the resulting mixture at a suitable temperature for a sufficient period of time to effect the acylation of furan or furan derivative, and removing the desired acylated product therefrom. The catalyst will preferably be added to the mixture of reactants in substantially pure form or as highly concentrated aqueous solutions. The use of more dilute solutions, in general, requires a greater addition of carboxylic acid anhydride to remove the water. The concentration and volume of acid employed should preferably be such that the acid is present in the reaction mixture in amounts of from about 0.5 to about 4 per cent by weight of the reactants.

The following detailed examples are for the purpose of illustrating modes of effecting the acylation of furan in accordance with the process of this invention. It is to be clearly understood that the invention is not to be construed as limited to the specific acylating agent used or to the specific conditions set forth in the examples.

*Example 1*

To a well-stirred mixture of 34 grams (0.5 mole) of furan and 107 grams (1 mole) of acetic anhydride were added 5 grams of 85 per cent ortho phosphoric acid. The mixture was then heated slowly to 35° C. over a period of 30 minutes and then heated rapidly to 60° C. in an additional 30 minutes. No reflux of furan was noted. The temperature of 60° C. was maintained for 30 minutes. The reaction mixture was then cooled, diluted with 100 milliliters of chloroform, water-washed and washed finally with sodium carbonate solution to remove last traces of acetic acid. Distillation yielded 34 grams (62 per cent of theory) of 2-acetyl furan.

*Example 2*

To a mixture of 110 grams of 95 per cent acetic anhydride and 3 grams of dihydroxyfluoboric acid was added 1 mole of furan. The mixture was stirred at room temperature for 3 hours and then treated according to the procedure of Example 1 to give 40 grams (36 per cent of theory) of 2-acetyl furan.

*Example 3*

To a mixture of 1 mole of benzoic anhydride and 3 moles of furan were added 3 grams of fluophosphoric acid. The mixture was refluxed for 3 hours at 40° C. and then washed with aqueous sodium hydroxide to remove excess anhydride and benzoic acid. Distillation of the reaction mixture yielded 130 grams of crude 2-benzoyl furan. 108 grams of the crude material upon vacuum distillation yielded 100 grams (70 per cent of theory) of pure 2-benzoyl furan having a boiling point of 140–150° C. at 2 millimeters pressure and when recrystallized from water and alcohol had a melting point of 43.5–44° C.

*Example 4*

To a mixture of 107 grams of 95 per cent acetic anhydride and 2 grams of paratoluene sulfonic acid were added 34 grams of furan. There was no heat of reaction noted. The mixture was heated at a reflux temperature of 56–64° C. for a period of 25 hours. The mixture was then treated according to the procedure of Example 1 to yield 24.5 grams (45 per cent of theory) of 2-acetyl furan having a melting point of 30–32° C. The 2,4-dinitrophenylhydrazone of the product melted at 219–220° C.

*Example 5*

To a mixture of 2 grams of 96 per cent sulfuric acid and 1 mole of acetic anhydride cooled to 0° C. were added 2 moles of furan. The heat of reaction was controlled at 10–20° C. by means of an ice bath. After 1 hour and 10 minutes, all heat of reaction was over. Two hundred milliliters of water were then added to the mixture and 46 grams (42 per cent of theory) of 2-acetyl furan were isolated according to the procedure of Example 1.

From the above examples it will be seen that strong hydroxy acids containing sulfur, phosphorus, or fluorine are effective catalysts for the acylation of furan. Likewise, furan derivatives having one or more substituent groups attached to the furan ring may be acylated in accordance with this invention. The acylated furans as produced in accordance with the process described herein have found a variety of uses and may be employed as solvents, addition agents for petroleum fractions, plasticizers, resin intermediates and intermediates for chemical synthesis. Long chain alkyl furyl ketones may be utilized as synthetic lubricants, di-electrics, waxes and extreme pressure additives for mineral oils.

We claim:

1. A process for nuclear acylation of a furan comprising reacting the same with a carboxylic acid anhydride in the presence of a strong hydroxy acid characterized by an initial ionization constant greater than about $1.0 \times 10^{-2}$ containing at least one element selected from the group consisting of sulfur, phosphorus, and fluorine.

2. A process for nuclear acylation of a furan comprising reacting the same with a carboxylic acid anhydride in the presence of a strong hydroxy acid of phosphorus having an initial ionization constant greater than about $1.0 \times 10^{-2}$.

3. A process for nuclear acylation of a furan comprising reacting the same with a carboxylic acid anhydride in the presence of a strong hydroxy acid of sulfur having an initial ionization constant greater than about $1.0 \times 10^{-2}$.

4. A process for nuclear acylation of a furan comprising reacting the same with a carboxylic acid anhydride in the presence of a strong hydroxy fluorine-containing acid having an initial ionization constant greater than about $1.0 \times 10^{-2}$.

5. A process for nuclear acylation of a furan comprising reacting the same with a carboxylic acid anhydride in the presence of ortho phosphoric acid.

6. A process for nuclear acylation of a furan comprising reacting the same with a carboxylic acid anhydride in the presence of sulfuric acid.

7. A process for nuclear acylation of a furan comprising reacting the same with a carboxylic acid anhydride in the presence of fluorophosphoric acid.

8. A process for nuclear acylation of a furan comprising reacting the same with a carboxylic acid anhydride in the presence of from about 0.1 to about 4 per cent by weight of a strong hydroxy acid characterized by an initial ionization constant greater than about $1.0 \times 10^{-2}$ containing at least one element selected from the group consisting of sulfur, phosphorus, and fluorine.

9. A process for nuclear acylation of a furan comprising reacting the same with a carboxylic acid anhydride in the presence of from about 0.1 to about 4 per cent by weight of ortho phosphoric acid.

10. A process for nuclear acylation of a furan comprising reacting the same with a carboxylic acid anhydride in the presence of from about 0.1 to about 4 per cent by weight of sulfuric acid.

11. A process for nuclear acylation of a furan comprising reacting the same with a carboxylic acid anhydride in the presence of from about 0.1 to about 4 per cent by weight of fluophosphoric acid.

12. A process for nuclear acylation of a furan comprising reacting the same with a carboxylic acid anhydride in the presence of from about 0.1 to about 4 per cent by weight of a strong hydroxy acid characterized by an initial ionization constant greater than about $1.0 \times 10^{-2}$ containing at least one element selected from the group consisting of sulfur, phosphorus and fluorine at a temperature of between about $-20°$ C. and about $60°$ C. for a period of from about ½ hour to about 3 hours.

13. A process for nuclear acylation of a furan comprising reacting the same with a carboxylic acid anhydride in the presence of from about 0.1 to about 4 per cent by weight of ortho phosphoric acid at a temperature of between about $-20°$ C. and about $60°$ C. for a period of from about ½ hour to about 3 hours.

14. A process for nuclear acylation of a furan comprising reacting the same with a carboxylic acid anhydride in the presence of from about 0.1 to about 4 per cent by weight of sulfuric acid at a temperature of between about $-20°$ C. and about $60°$ C. for a period of from about ½ hour to about 3 hours.

15. A process for nuclear acylation of a furan comprising reacting the same with a carboxylic acid anhydride in the presence of from about 0.1 to about 4 per cent by weight of fluophosphoric acid at a temperature of between about $-30°$ C. and about $60°$ C. for a period of from about ½ hour to about 3 hours.

16. A process for nuclear acylation of a furan comprising reacting the same with a fatty acid anhydride in the presence of a strong hydroxy acid characterized by an initial ionization constant greater than about $1.0 \times 10^{-2}$ containing at least one element selected from the group consisting of sulfur, phosphorus, and fluorine.

17. A process for nuclear acylation of a furan comprising reacting the same with an aromatic acid anhydride in the presence of a strong hydroxy acid characterized by an initial ionization constant greater than about $1.0 \times 10^{-2}$ containing at least one element selected from the group consisting of sulfur, phosphorus, and fluorine.

18. A process for nuclear acylation of a furan comprising reacting the same with benzoic acid in the presence of a strong hydroxy acid characterized by an initial ionization constant greater than about $1.0 \times 10^{-2}$ containing at least one element selected from the group consisting of sulfur, phosphorus, and fluorine.

19. A process for nuclear acylation of a furan comprising reacting the same with benzoic acid in the presence of fluophosphoric acid.

20. A process for nuclear acylation of a furan comprising reacting the same with acetic acid in the presence of ortho phosphoric acid.

HOWARD D. HARTOUGH.
ALVIN I. KOSAK.

REFERENCES CITED

The following references are of record in the file of this patent:

Ann. 424, 1 (1921).
Chemical Reviews, volume 17, 1935; pages 360, 361, 374 to 377.
Berkman, Catalysis, page 658, Reinhold Pub. Co., 1940.